United States Patent
Fang et al.

(10) Patent No.: US 6,243,816 B1
(45) Date of Patent: Jun. 5, 2001

(54) SINGLE SIGN-ON (SSO) MECHANISM PERSONAL KEY MANAGER

(75) Inventors: Yi Fang, Austin; I-Lung Kao, Round Rock; Ivan Matthew Milman; George Conerly Wilson, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,512

(22) Filed: Apr. 30, 1998

(51) Int. Cl.$^7$ ..................................................... H04L 9/00
(52) U.S. Cl. .................. 713/202; 713/201; 713/183; 709/229; 707/9
(58) Field of Search .................... 713/201, 153, 713/155, 183, 202; 709/229; 707/9

(56) References Cited

U.S. PATENT DOCUMENTS

| | | | |
|---|---|---|---|
| 4,604,686 | 8/1986 | Reiter et al. | 395/500 |
| 4,937,036 | 6/1990 | Beard et al. | 340/706 |
| 4,999,766 | 3/1991 | Peters et al. | 364/200 |
| 5,021,949 | 6/1991 | Morten et al. | 364/200 |
| 5,047,923 | 9/1991 | Elstner et al. | 364/200 |
| 5,226,172 | 7/1993 | Seymour et al. | 395/800 |
| 5,241,594 | 8/1993 | Kung | 380/4 |
| 5,329,619 | 7/1994 | Pagé et al. | 395/200.09 |
| 5,347,632 | 9/1994 | Filepp et al. | 395/200.09 |
| 5,369,778 | 11/1994 | San Soucie et al. | 395/800 |
| 5,434,918 | 7/1995 | Kung et al. | 380/25 |
| 5,442,342 | 8/1995 | Kung | 340/925.34 |
| 5,442,771 | 8/1995 | Filepp et al. | 395/200.08 |
| 5,564,043 | 10/1996 | Seifert | 695/614 |
| 5,579,479 | 11/1996 | Plum | 395/188.01 |
| 5,590,199 * | 12/1996 | Krajewski, Jr. et al. | 380/25 |
| 5,594,910 | 1/1997 | Filepp et al. | 395/800 |
| 5,655,077 * | 8/1997 | Jones et al. | 713/201 |
| 5,684,950 * | 11/1997 | Dare et al. | 713/201 |
| 5,768,504 * | 6/1998 | Kells et al. | 713/201 |
| 5,864,665 * | 1/1999 | Tran | 713/201 |
| 5,944,824 * | 8/1999 | He | 713/201 |
| 6,000,033 * | 12/1999 | Kelley et al. | 713/201 |
| 6,006,333 * | 12/1999 | Nielsen | 713/202 |

FOREIGN PATENT DOCUMENTS

| | | | |
|---|---|---|---|
| 0751453 | 5/1996 | (EP) | G06F/1/00 |
| 2281645 | 3/1993 | (GB) | G06F/12/14 |

OTHER PUBLICATIONS

Vacca, "Sign On to Streamlined Security", Journal: Datamation, v40 n18 p. 65, Sep. 1994.*
IBM Technical Disclosure Bulletin, "Network Signon Coordination Configuration," vol. 36, No. 12, Dec. 1993 (pp. 389–396).
IBM Technical Disclosure Bulletin, "Logon Assist for Multiple Logons," vol. 32, No. 8A, Jan. 1990 (pp. 303–305).
IBM Technical Disclosure Bulletin, "Temporary Global Passwords," vol. 36, No. 3, Mar. 1993 (pp. 451–453).

* cited by examiner

Primary Examiner—Robert Beausoleil
Assistant Examiner—Scott T. Baderman
(74) Attorney, Agent, or Firm—Jeffrey S. LaBaw; David Judson; Joseph R. Burwell

(57) ABSTRACT

A method of managing passwords of users desiring access to multiple target resources in a computer enterprise environment. For each given user, each of a set of id/password pairs is associated to each of a set of one or more respective targets. Each id/password pair is normally required to access a respective target resource. The targets of each given user are stored in a globally-accessible database. In response to entry by a given user at a client machine of a single-sign on (SSO) id/password, the globally-accessible database is accessed from a personal key manager (PKM) server to retrieve the targets of the given user. The targets are returned to the PKM server, which then uses data therein to access the respective target resources on behalf of the given user at the client machine.

31 Claims, 8 Drawing Sheets

SINGLE SIGN-ON (SSO) MECHANISM PERSONAL KEY MANAGER

BACKGROUND OF THE INVENTION

1. Technical Field

The present invention relates generally to accessing heterogeneous networks and reducing costs by increasing productivity for end-users and system administrators in an enterprise computer environment.

2. Description of the Related Art

With sprawling client-server systems growing daily, applications and information are spread across many PC networks, mainframes and minicomputers. In a distributed system environment connected by networks, a user must access many database systems, network systems, operating systems and mainframe applications. To use these systems and applications, the user must issue separate sign-on commands for each specific system or application. Indeed, it is not unusual for a user to encounter ten or more different login sessions during a working shift, and these often are different interfaces with different user id and authentication information, usually passwords. This places the user under a significant burden to remember and maintain this information.

It would be quite beneficial to provide a single sign-on (SSO) tool to enable authorized users to perform one initial sign-on to access a variety of networks, systems and applications. A single sign-on system should provide secure storage of user passwords, support for more than one user password, as well as support for multiple target logon methods. Each of these issues present varying design considerations.

With respect to the first issue, there are multiple approaches to storing and managing passwords. One approach is to use the same password for all accessible systems/applications. This technique may weaken system security, however, because a compromised password in any of the systems or applications compromises the user's privileges on these systems and applications at the same time. Further, different sign-on mechanisms may have their own distinctive password requirements and, thus, it is problematic to use the same password for multiple targets.

Another approach to storing and managing passwords is password-mapping, which refers to using the user's primary password to encrypt all the user's secondary passwords. The encrypted passwords are stored in a local storage space accessible to the user (e.g., a local file, a readable/writable smartcard, and the like). Once the primary password is verified, the local system authentication module obtains the passwords for other sign-on systems and applications by decrypting the mechanism-specific encrypted password with the primary password. The security of this password-mapping scheme assumes that the primary password is the user's strongest password, and it also depends on the security of the local storage for the secondary passwords. If secondary passwords are stored in an untrusted publicly accessible machine, an intruder is provided with opportunities for potential attacks. Although this approach is simple, the password file must be moved from machine to machine by the user to logon to more than one machine.

The target logon alternatives also influence the single sign-on system design. In particular, the method used for storing a user password heavily influences the design of target logon code. It is known to embed passwords in target specific logon scripts. This is how many "homegrown" single sign-on systems work today. This technique is the least extendible design because it ties passwords (and logon target code) to each machine the user uses. It is also hard to maintain passwords in this design because passwords need to be changed both in the applications and in the logon scripts. For a mobile user, the scripts need to be present on all machines the user might use. The overall security of this approach is thus very weak.

Another target logon alternative involves building in all the logon methods for every possible target to which any user may desire to logon. This "hardcoded" approach assumes that all workstations and applications are configured similarly and do not change. Because the logon methods are built into the solution, changes made to the logan methods require changes to the actual solution itself. This approach is costly and also is not very extensible.

These known approaches to secure password storage/management and target logon have yet to provide an adequate single sign-on solution. The present invention addresses and solves this problem.

BRIEF SUMMARY OF THE INVENTION

The present invention implements a single sign-on (SSO) mechanism that coordinates logons to local and remote resources in a computer enterprise with preferably one ID and password.

More specifically, this invention provides a single sign-on (SSO) framework that allow users to sign on to a client system one time entering one password. The SSO framework then signs on to other applications on the user's behalf.

The SSO framework supports storage of all passwords and keys belonging to a user in secure storage (e.g., either in local storage, a centralized password service, a smartcard, or the like), so that the user needs to remember only one ID and password. Upon authentication, the SSO mechanism securely retrieves all the passwords for a user from the secure storage and automatically (i.e. without additional user intervention) issues sign-ons to each system/application the user is authorized to access.

The system framework preferably includes a number of modules including a configuration information manager (CIM), which includes information on how to logon to the applications configured on a given machine, a personal key manager (PKM), which includes information about users, systems and passwords they use to logon to those systems, and a logon coordinator (LC), which retrieves the user's passwords from PKM and uses them in conjunction with target-specific logon code to log users onto all their systems, preferably without any additional user intervention.

The CIM facilitates adding new logon methods as needed. Information is preferably stored in the CIM using "templates" referred to as program template files (PTFs). A given PTF thus is used to create entries in the CIM. This template mechanism enables an application vendor to specify how to log on to a given application. Thus, independent software vendors and others can easily plug their applications into the SSO framework without writing a large amount of code.

The SSO framework preferably implements a "data model" where information used to sign on to applications is kept in the separate PKM and CIM databases. Preferably, the PKM is globally accessible and stores user-specific information, and the CIM is locally accessible and stores application-specific information derived from PTF files. In operation, the logon coordinator (LC) accesses the PKM to obtain the user's information (e.g., which target systems and applications to which the user can sign-on), as well as the passwords and keys for those systems/applications. The LC then uses these passwords/keys, together with the target logon information found in the CIM, to sign-on to various target systems and applications. Sign-on is preferably based upon the target's own protocols and mechanisms as defined in the PTF.

Another objective of this invention is to allow applications to be plugged into the single sign-on (SSO) framework. According to the invention, the program template file (PTF) is used to inform the single sign-on mechanism how to interact with a given application or subsystem to perform SSO-related operations. The PTF enables applications to be plugged into the SSO mechanism without changing the SSO code itself and without requiring any programs to be written to plug into the new application.

Still another more general objective of this invention is to provide a framework-type SSO mechanism that enables any kind of target to be user-specified.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
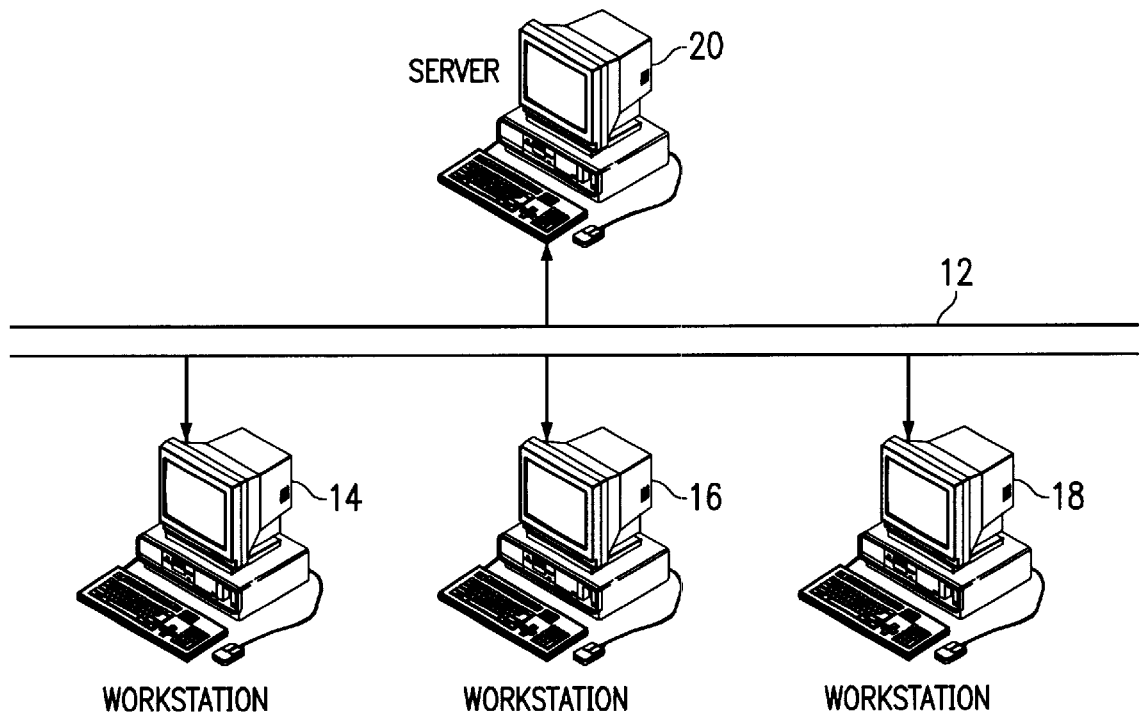
FIG. 1 is a computer enterprise environment in which the present invention may be implemented.

FIG. 1 illustrates a portion of a distributed computer environment domain 10 in which the present invention may be implemented. The signal sign-on (SSO) mechanism comprises both server 20 and client (runtime services) components 14, 16 and 18. For purposes of illustration, each of these are illustrated as a computer. It is also assumed that system users log onto the domain via client machines in a known manner.

Preferably, the server and client services components of the SSO mechanism are implemented in a computer or "machine." For example, each server may be a RISC System/6000® (a reduced instruction set or so-called RISC-based workstation) running the AIX ((Advanced Interactive Executive) operating system, preferably Version 4 or greater. Alternative servers include machines running Sun Solaris V 2.5.1 or Microsoft Windows NT 4.0.

Each client machine in the domain may be a computer such as a desktop machine or laptop. A typical client machine is an Intel x86 or Pentium®-based computer running Windows '95 or greater operating system. Alternatives include machines running OS/2® Warp 3.x or higher, or a Microsoft Windows NT workstation. Each client workstation typically supports TCP/IP and may include a network operating system (NOS). A typical client is a Novell Netware client (for Netware logons), an OS/2 LAN Server client (for OS/2 LAN Server logons), an OS/2 Warp Server client (for OS/2 Warp Server logons), or the like. These examples, however, are merely representative and should not be construed to limit the invention in any way.

Many different types of target systems/applications are accessed using the single sign-on mechanism. These include distributed applications, databases, printers, and other resources throughout the enterprise. Representative systems and applications include, without limitation: 3270 and 5250-based applications, IBM OS/2 Lan Server 4.x and OS/2 Warp Server, Novell Netware 3.x and 4.x, Microsoft NT 4.0 Server, Databases (e.g., DB2, Oracle, Sybase, Informix, MS SQL Server), Lotus Notes 4.x, PeopleSoft applications, DCE applications written to conform to The Open Group (formerly known as the Open Software Foundation), and other applications. These examples, again, are merely representative.

Figure 2:
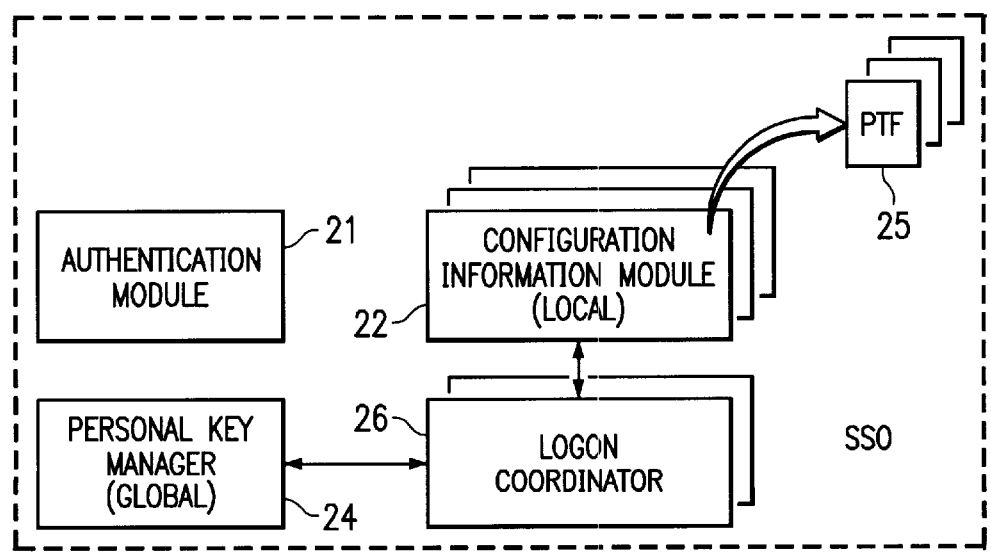
FIG. 2 is a block diagram of the main functional components of the inventive single sign-on (SSO) mechanism.

FIG. 2 illustrates the main components of the inventive single sign-on (SSO) mechanism of the present invention. They preferably include an authentication module 21, a configuration information manager (CIM) 22, a personal key manager (PKM) 24, and a logon coordinator (LC) 26. In general, the authentication module 21 authenticates a given user to the remainder of the single sign-on (SSO) mechanism. On systems with local operating system security, the authentication mechanism 21 usually is integrated with the local OS authentication. The authentication module preferably supports different authentication mechanisms (e.g., secret key, smartcards, public/private key, and the like).

The configuration information manager (CIM) 22 includes information on how to logon to the applications configured on a given machine. Preferably, a CIM is supported on each client machine from which the SSO mechanism is provided. A given CIM typically is not globally accessible from other machines on the domain. Information in the CIM preferably is formatted according to a program template file (PTF) 25, as will be illustrated below in more detail. The CIM thus stores "configuration directives" identifying the given logon process and the methods required to access a particular application on the target resource. New logon methods may be added using the PTF mechanism as will be seen.

The PKM 24 contains information about users, systems and passwords they use to logon to those systems.

Preferably, PKM 24 is a secure, globally accessible repository that facilitates the single sign-on process. Although not meant to be limiting, with respect to a given user, the PKM (as will be described) preferably stores such information as a username, a set of one or more password(s), and any other application environment-specific information such as domain name, hostname, application name, and the like. Because this access information preferably is centralized in the PKM, users can access their target resources with one sign-on from any workstation. They can also manage their passwords from this one repository, as will also be seen.

To this end, the logon coordinator 26 functions generally to retrieve the user's passwords from the PKM and uses them in conjunction with the target specific logon code (identifiable from the CIM entries) to log users onto all (or some subset of) their systems, preferably without any additional user intervention. As will be described in more detail below, the LC also preferably maintains state information for a given user and application, called a "user target", to help coordinate and execute future operations.

According to the invention, the single sign-on mechanism preferably uses a "data model" where information used to sign on to applications is kept in two separate databases. The first database is the PKM 24, which is preferably a global database and is thus accessible from all client machines in a given domain. The PKM 24, as noted above, keeps user configuration information. The second database is the CIM 22, which is preferably a local database and is thus accessible only from the current client machine. The CIM need not be merely a local database, however. Each client machine from which the SSO support is provided runs a CIM. Thus, multiple instances of CIM 22 are illustrated in FIG. 2. Likewise, each client machine preferably also runs an instance of the logon coordinator 26.

Thus, for example, the PKM 24 contains user-specific application data which includes:

Target name—uniquely identifying a user "target"

Target type—specifies what type of "application" this target is;

Domain/Host/Application name—specifies application information, specific for this target;

User ID—specifies user id on target;

Key information—specifies the user's key (password) on the target;

User preferences—specifies user specific information for this target; and

Preferred program name—specifies a preferred PTF entry to use with this target.

The personal key manager 24 enables a given SSO user to manage all the passwords the user possesses in a secure and effective manner. According to the invention, each application, server, or system to which a user needs an ID/password pair to logon is defined as a "target". Using a GUI interface, the user creates a target in PKM corresponding to each real target to which the user can logon, and the user may create as many (or as few) targets as the capability of a specific PKM implementation allows (or that the user desires). Independent of any implementation, a generic PKM application programming interface (API) preferably is used by the SSO framework to create a new target, to update a target's data, to query a target's information (with or without passwords), and to delete an existing target.

The second database, the CIM 22, preferably contains entries derived from the program template files (PTFs). This database contains application (i.e. program) specific information, which includes (for example):

Target type—specifies what type of "application" the program is;

Default target—indicates if an entry is the default of a given type;

Specific application information—describes interfaces needed to perform operations like logon, logoff, and the like;

Program Preferences—indicates timeouts and retry counts; and

Interface directory—client-specific information on how to locate the application interface code.

Figure 3:
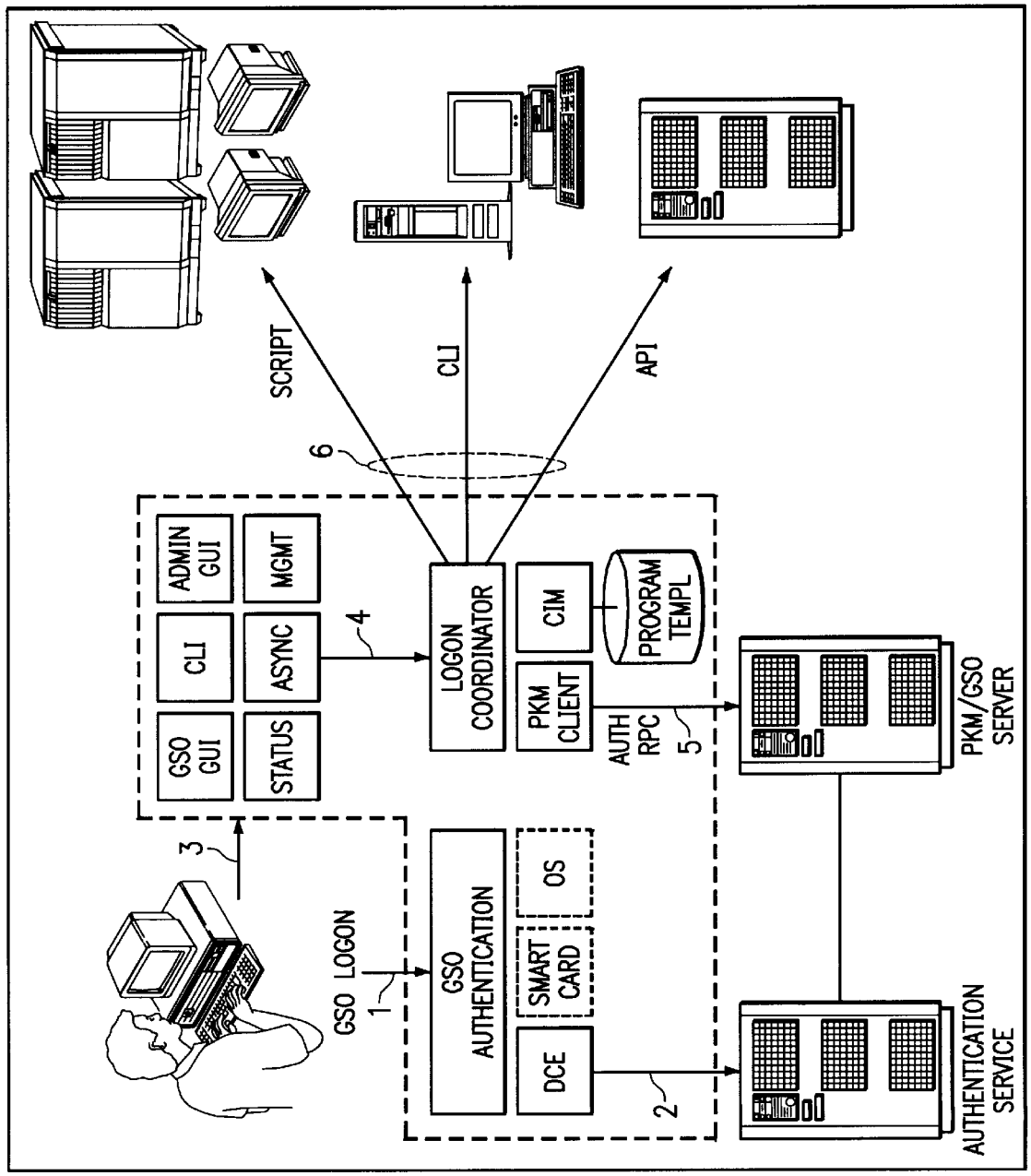
FIG. 3 is a representative single sign-on transaction according to the present invention.
Figure 4:
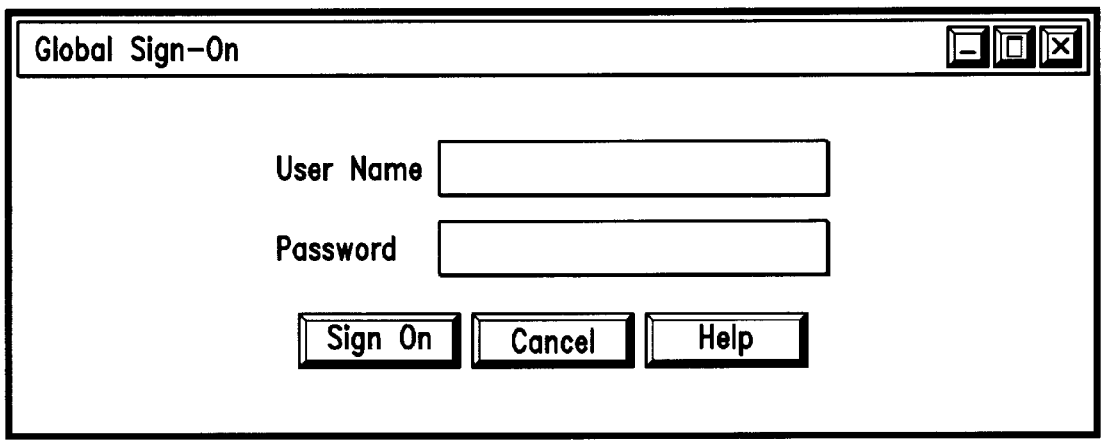
FIG. 4 is a representative logon interface screen for the SSO transaction of FIG. 3.

The expected runtime flow of a user interacting with the single sign-on (SSO) mechanism is illustrated in FIG. 3 and described as follows. At step 1, a user either logs in to a local operating system (if required by the local operating system) or logs on via a logon interface (if local logon is not required by the operating system). A representative logon interface screen is illustrated, for example, in FIG. 4. The user's local logon enables the authentication module (GSO Auth) on the local machine (if supported) to authenticate the user (step 2) to the authentication service that is integrated with the password storage service.

Figure 5:
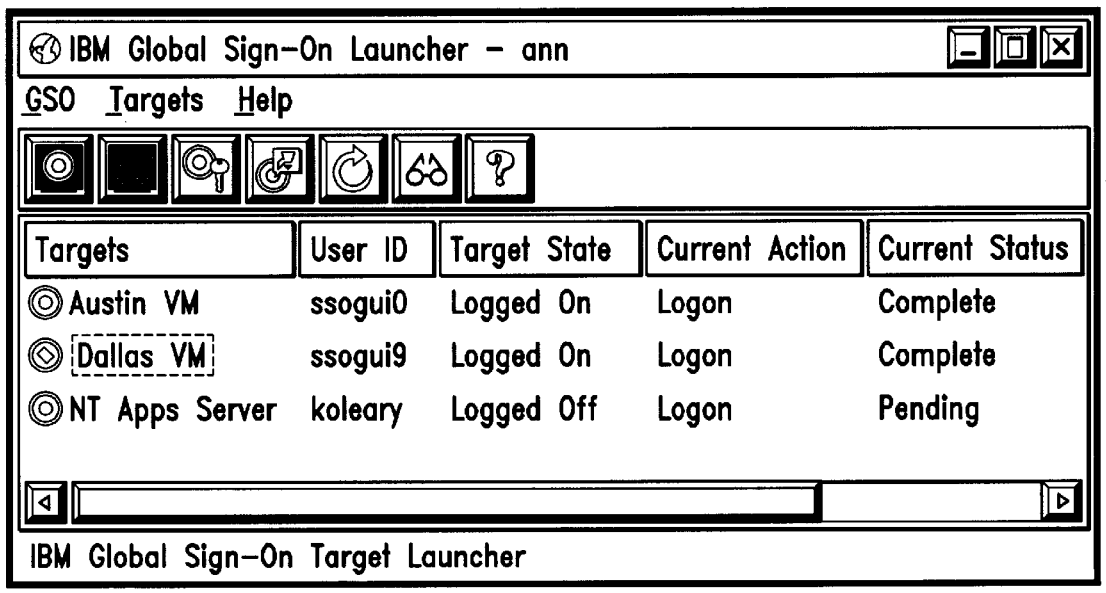
FIG. 5 is a representative GUI screen identifying the systems/applications for a particular user.

A successful authentication triggers the single sign-on graphical user interface (GUI) to display (at step 3) the systems/applications the user is able to logon to and the status of the logon process. A representative GUI screen display is illustrated in FIG. 5. The GUI also calls the logon coordinator on the local machine (at step 4) to retrieve the user's configuration information and target configuration information. As described, the logon coordinator gets the user's information (which target systems and applications the user can signon to) and the passwords and keys for those systems/applications from the personal key manager. If the personal key manager is implemented as a remote service (or if the necessary information is located remotely), the personal key manager client (at step 5) gets the information in a secure fashion (i.e. the passwords/keys are encrypted for transmission). The credentials returned from the authentication module are used by the personal key manager client to ensure that the user who logged on to the mechanism is the user who retrieves the passwords.

The logon coordinator (step 6) then uses these passwords/keys and the target logon information found in the configuration information manager (CIM) to sign-on to various target systems and applications, based upon the targets' own protocols and mechanisms. The logon coordinator preferably provides status information about the state of the logons and also allows some targets to be launched asynchronously (after the initial sign-on processing has completed).

This mechanism allows for different passwords for different target systems and applications without requiring the user to remember all such passwords. The user remembers only one password to log into the mechanism, which then performs the subsequent logging into the different system by acquiring the secret keys from the secured key manager (local or remote). This SSO mechanism enhances security as well as ease of use. It also enables the user to access existing systems without having to create or to modify existing user definitions on those systems. As will be seen, the mechanism also allows a user to change his or her single sign-on password without requiring changes of the target keys/passwords or vice versa. Target password changes can be made to one or more selected target systems.

Figure 6:
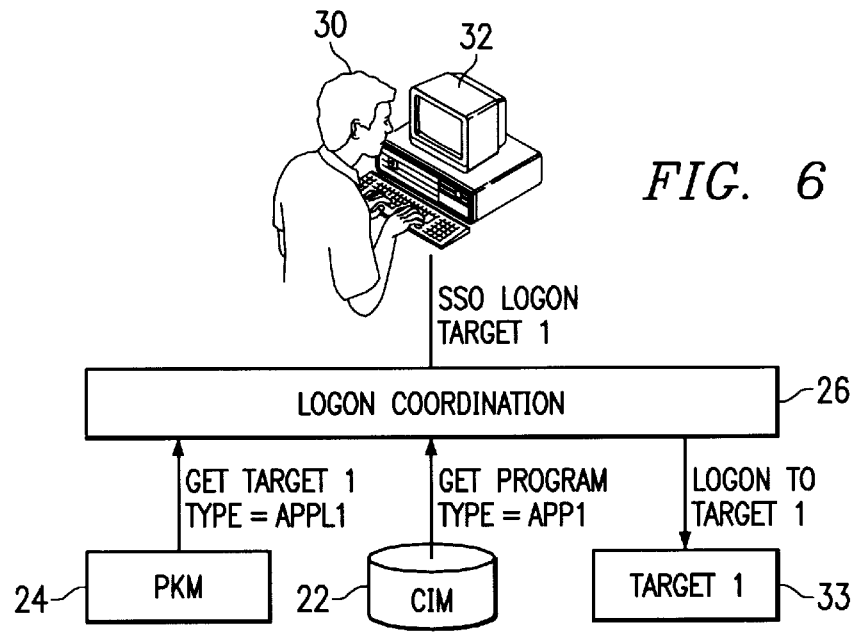
FIG. 6 is a high level illustration of the operation of the logon coordinator (LC) of the SSO mechanism.
Figure 7:
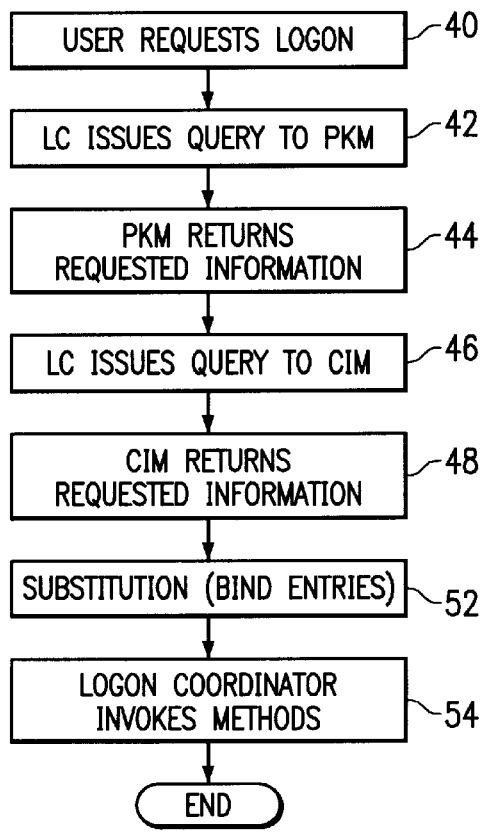
FIG. 7 is a flowchart illustrating the LC operation.
Figure 8:
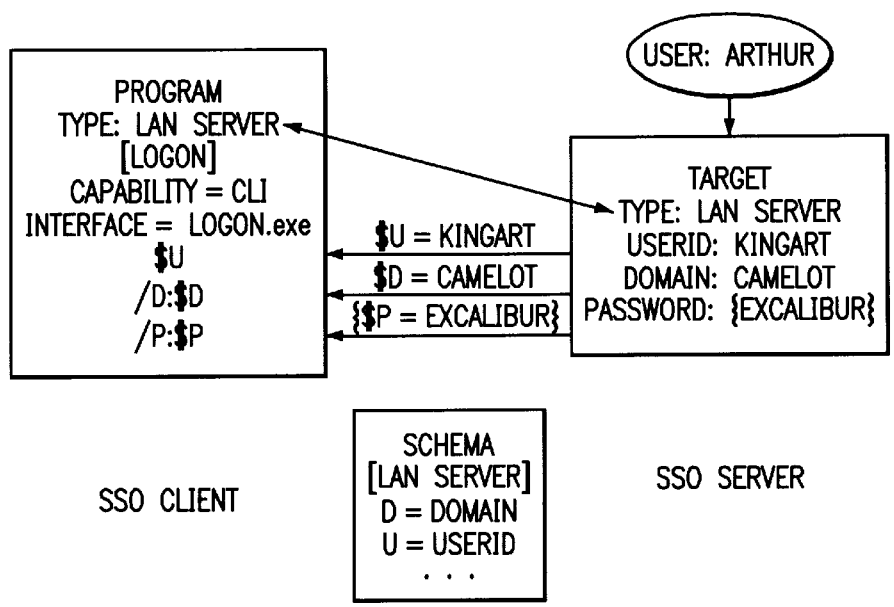
FIG. 8 illustrates how the logon coordinator performs a matching operation between PKM and CIM entries.

FIG. 6 is a high level illustration of the operation of the logon coordinator 26. FIG. 7 is a flowchart illustrating one preferred single sign-on method, which may be suitably implemented in a computer program. The routine begins at step 40 when a user 30 (at a workstation 32) requests a logon to a given application (Target 1) 33. In response, the routine continues at step 42 with the logon coordinator 26 issuing a query to the PKM 24 for the information regarding the user's "key" (which, as described above, may include the username, password, and any other application environment-specific information as described above). At step 44, the information is returned to the logon coordinator. Then, the routine continues at step 46 with the LC issuing a query to the CIM to obtain the target information. At step 48, the target information is returned to the LC. The information retrieved from the CIM 22 for the particular application determines how to logon to the application (e.g. what type of invocation to make, what actual invocation, and the like). At step 52, the logon coordinator 26 substitutes given data received from the PKM into substitution variables in the invocation strings returned from the CIM. In particular, the logon coordinator performs a matching operation; for each PKM target entry, the coordinator determines whether there is a corresponding CIM entry. If so, step 52 binds the two entries together. This is illustrated in FIG. 8. At step 54, the logon coordinator 26 invokes the logon method(s) defined by and stored in the CIM. This completes the processing.

Generalizing, the logon coordinator (LC) thus takes the data from the personal key manager (PKM) and the directives in the PTF and interprets the data, together with current state information, to perform a given action. Such action is carried out with respect to the users' systems and applications and includes, for example, a logon operation, a change password operation, or a logoff operation.

Figure 9:
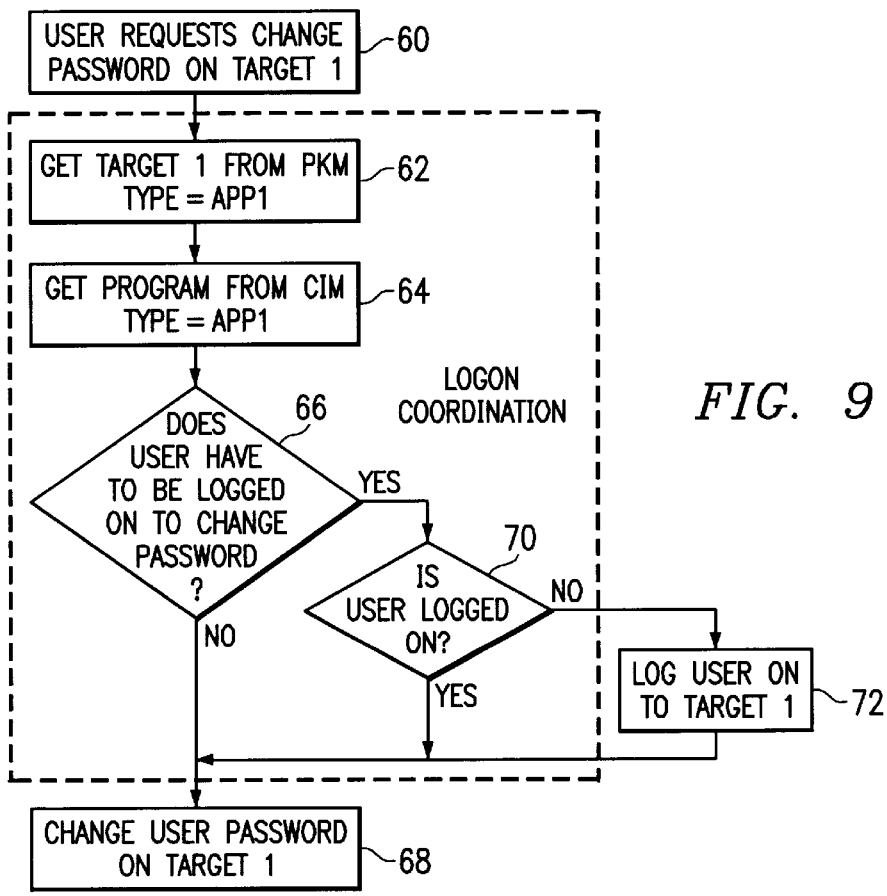
FIG. 9 is a flow chart of a change password operation.

If the user requests a change password operation, the LC makes the correct invocation to change the password and coordinates the password update in the PKM. Continuing with the above-described example (involving Target 1) a representative flowchart of this function is illustrated in FIG. 9. By way of brief background, the logon coordinator preferably maintains state information for a given user and application, a "user target", to help coordinate and execute future operations. By looking at the current state of a user target and interpreting data in the PKM entry and the PTF, the LC can determine which operations are required to satisfy an SSO request. For example, the PTF can specify that a user should be logged on to an application before performing a change password operation. Therefore, the LC would keep track of the logon state of a user target to determine what operations are required to satisfy a change password request. If the user were not logged on to the application, the LC would perform a logon operation and then perform the change password operation.

The flowchart of FIG. 9 is illustrative of the process. The routine begins at step 60 when the user desires to change a password for his/her Target 1. At step 62, the routine gets Target 1 information from the PKM; here, the target type is App1. The routine then gets the corresponding program of the given type from the CIM at step 64. A test is then performed at step 66 to determine whether the user has to be logged on to change his/her password. If not, the routine continues at step 68 and the user password is changed. If, however, the outcome of the test at step 66 is positive, a test is performed at step 70 to determine whether the user is logged on. If the outcome of the test at step 70 is positive, the routine branches to step 68; otherwise, the user is first logged on at step 72. This completes the processing.

A combination of the data model described and the LC implementation thus provides "free seating" support. Free seating means that the user does not have to specify a particular program on the client when using the SSO mechanism to log onto a particular target. The free seating method allows the user to install any program on his or her client machine and then have the logon coordinator pick the appropriate one to logon to the target. The LC preferably does this by examining the "target type" associated with the programs on the client and with the target the user is trying to access. If the program has the same target type as the target, then the LC knows it can use that program to access that target. This means that the user can logon to a target if any program on the system matches the target type, rather than needing a fixed program to do the logon.

For example, a user may have a target "HOST1" of type "3270 Emulator." On the machine on the user's desktop, the user may have the "telnet3270" program, which is of the type "3270 Emulator" available to logon to HOST1. On the user's laptop, the user may have the IBM Personal Communicator program available, which is also a 3270 Emulator, to logon to that target. When the user uses the SSO mechanism on the desktop machine, the LC will use telnet3270 as the 3270 Emulator to logon to HOST1; on the laptop, IBM Personal Communicator will be used. These examples, of course, are merely representative of the inventive free seating support concept.

The generic PKM data model described above may be implemented in many ways including, without limitation, DCE client/server, a real smartcard, a soft (disk-based) virtual smartcard, or the like. One advantage of using an implementation-independent PKM API as described herein is that different mechanisms may be pluggable without any modification to other SSO application programs. Moreover, multiple mechanisms can be configured on one machine and a user has the option to choose a specific one.

A representative PKM is implemented in a known DCE Security Registry architecture conforming to The Open Group DCE Standard. Familiarity with DCE security mechanisms is presumed in the following discussion.

Figure 10:
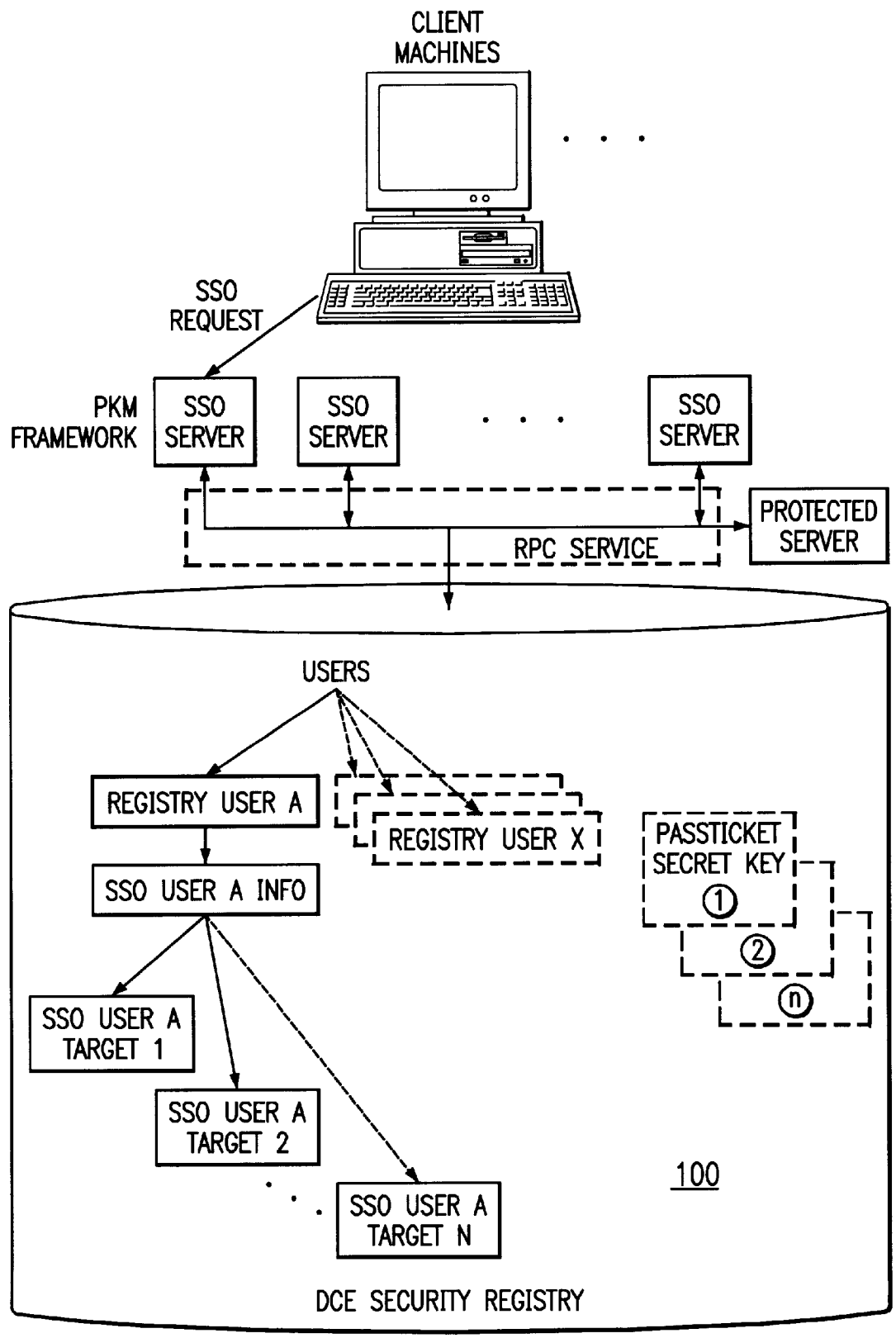
FIG. 10 is a block diagram of a representative multiple SSO server implementation and a DCE Security Registry for supporting the PKM data model.

FIG. 10 illustrates the basic PKM architecture, which may be distributed across multiple machines in the domain. In particular, it is first assumed that multiple SSO servers 100a–n are configured and running in the domain. Multiple PKM servers are replicated on different machines, e.g., for performance and scalability. Each server preferably performs the same functions. Thus, preferably there is no master/slave relationship among them. As also seen in FIG. 10, user specific target configuration data and target passwords (together, PKM data) of sso users are stored in a database, which may be the DCE extended registry database (ERA). When the PKM server modifies data in the master registry, data consistency between the master and slave registries is achieved automatically by the data duplication mechanism in registries. However, no encryption facilities are provided by the registry for data stored in the database. To avoid target passwords being revealed to DCE administrators (and others), the password field is preferably encrypted with a master key managed by the PKM server, before the whole target is stored in the database.

Moreover, because the database usually does not provide cryptographic facilities to protect data from viewing by other channels (like dcecp or programs using ERA API), the confidentiality of target passwords is achieved by encrypting the passwords before they are stored therein by sso servers. To this end, a "master key" is preferably used to encrypt all the target passwords of users in sso. Further, because multiple sso servers can be configured for load balancing, a local copy of this master key preferably exists in each one of sso servers.

The use of a master key is advantageous even if ERA 100 provides facilities to encrypt data. A main advantage is performance, because only the password field, not all other user configuration fields, in a target actually needs encryption. Using a master key outside of the database mechanism (registry) affords flexibility to protect only the fields that need encryption. Moreover, the protection level used in the existing DCE RPC service 104 to store/retrieve data between ERA and sso servers only needs integrity, rather than privacy, if passwords are already encrypted before they are sent through the RPC service.

Figure 11:
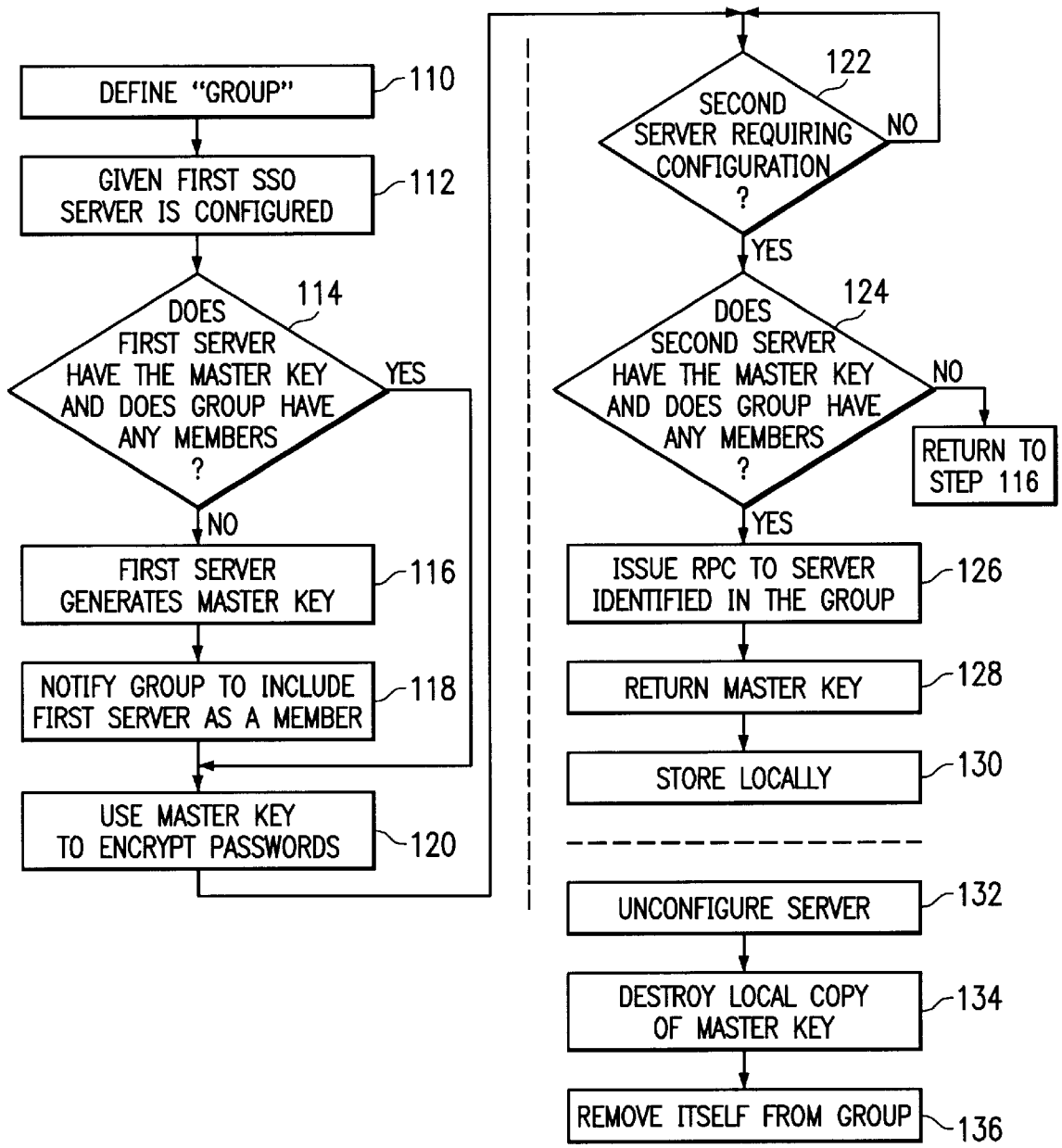
FIG. 11 is a flowchart of a method for distributing and synchronizing a "master key" in the multiple SSO implementation of FIG. 10.

The inventive mechanism provides automatic master key distribution from one SSO server to another as described below and as illustrated in the flowchart of FIG. 11. Furthermore, the master key preferably is allowed to change, as initiated by sso administrators who have concerns about possible key exposure. Once a new master key is generated on one server and all the target passwords in ERA are reencrypted, all other sso servers will contain invalid master keys. Therefore, according to the invention, master keys are resynchronized among all existing servers after the master key is modified.

This is achieved as follows. At step 110 in the flowchart, a "group" is defined in the registry to record which sso servers contain valid master keys. The principles of using this group and the action each sso server takes depending on the content of this group (called "keyedservers") are elaborated below.

At step 112 the first server is configured and started to run. At step 114, the first server performs a test to detect where it already has a master key copy locally and whether there exist any members in the keyservers group. If the answers to both detections are "no," the server assumes it is the first server to be configured. The routine continues at step 116 with the first server generating a master key locally. At step 118, the first server puts itself in the keyedservers group established at step 110. The server then starts to use the master key (at step 120) to encrypt all the target passwords.

The routine then enters a process loop for another server. Thus, for example, a test is done at step 122 to determine whether a second server is configured. If not, the routine cycles. If the outcome of step 122 is positive, the second server performs a similar detection scheme (like the first server) at step 124. Because the first server has a master key, the outcome of the test at step 124 is positive. In other words, this second server finds there already exists a member in the keyservers group, and it thus knows the master key has already been generated by this member of the group (the first server). The second server then continues at step 126 by sending a request (e.g., through an internally-defined RPC) to that member server to retrieve the master key. At step 128, the master key is returned. The retrieved master key is then stored locally in the second server at step 130. All the other servers configured after the first one perform the same actions. When any server is unconfigured as indicated at step 132, it destroys its own local copy of the master key at step 134 and removes itself from the keyedservers group at step 136.

Figure 12:
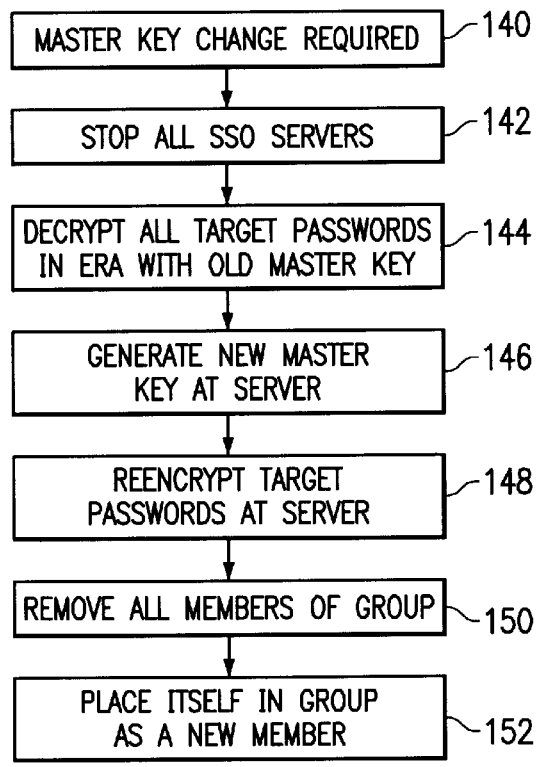
FIG. 12 is a flowchart of a method for changing the master key.

FIG. 12 is a flowchart illustrating a master key change routine. It begins at step 140 when the master key is to be changed, e.g., due to security concerns. At step 142, all the servers are stopped. At step 144, the server on which the sso administrator operates decrypts all target passwords in ERA 102 with the old master key. A new master key is generated at step 146, and this new master key is then used to reencrypt target passwords at step 148. The server then removes all server members from the keyedservers group at step 150 and, at step 152, puts itself in the group (because it is now the only server with a valid master key). When other servers are restarted, they will not detect themselves in the keyedservers group (as described above) and then know their current local copies of the master key are no longer valid. They then retrieve the new master key from the server member in the group, and use it to replace the old master key as described.

The master key thus is generated automatically by one server machine and "pulled" as needed by other servers when they are up and running. A simple "group" mechanism provided by DCE is used to tell which servers possess the valid master key.

The PKM data model elements were described above. The groups include: target name, target attributes, key information, user configuration and target class. The target name is the identifier used to distinguish a target from other targets. The target attributes include target type, domain/host/application names and target user name. The key information contains the password of the user for the target and the type of the key derived from the password (e.g., a public key, a secret key, or the like). The user configuration is the user's own configuration preference when the user logons to and logoffs from the target. The target class defines whether the target is a password-based target or a passticket-based target. If it is a passticket-based target, a passticket-protected (e.g., RACF) application server's name must usually be specified. The above-described generalized data model enables all kinds of targets to be defined through the PKM API. Thus, in certain circumstances, not all the fields/attributes may have values for each target because only a subset of attributes may be sufficient or meaningful for defining a specific, real target. In addition, because a passticket for a protected server is dynamically-generated on demand, no password is required to be stored with a passticket-based target.

Figure 13:
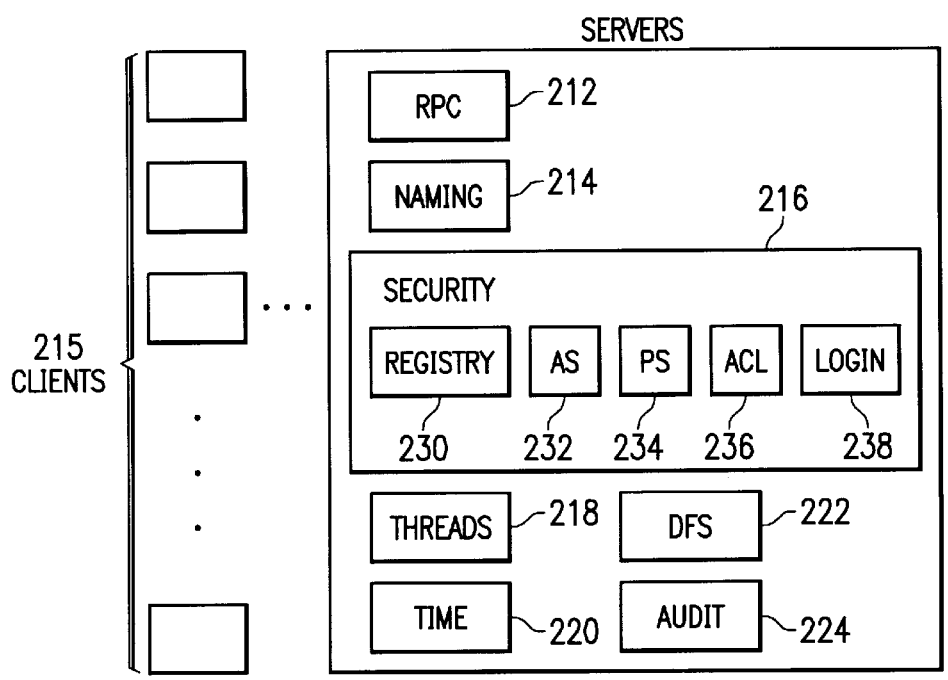
FIG. 13 is a block diagram of a known DCE domain implementation.

PKM is preferably implemented as a client/server application on DCE. FIG. 13 is a block diagram of a known DCE domain implementation. A representative DCE cell is shown symbolically in FIG. 13 and comprises a set of connected machines, including at least one server and the DCE clients, which share a common cell name and a namespace. The cell typically includes server machines that provide distributed services that support the development, use and maintenance of distributed applications in a heterogeneous networked environment. These include a remote procedure call (RPC) Service 212, a Naming (Directory) Service 214, a Security Service 216, a Threads Service 218, a Time Service 220 and a Distributed File System (DFS) Service 222. As is well-known, the RPC Service 212 (which is typically not a standalone server) implements the network protocols by which the client and server sides of an application communicate. The Naming Service 214 provides a central repository for information about resources in the system. The Security Service 216 provides secure communications and controlled access to resources in the system. The Threads Service 218 supports the creation, management and synchronization of multiple threads of control within a single process. The Time Service 220 synchronizes time on the computers. The DFS Service 222 allows users to access and share files stored on a file server anywhere in the network without having to know the physical location of the file.

The Audit Service 224 is used to write or log an audit record through Audit application programming interfaces (APIs). The DCE Security Service 216 includes a Registry Service 230, an Authentication Service or AS 232, a Privilege Service 234, an Access Control List (ACL) Facility 236, and a Login Facility 238. The identity of a DCE user or service is verified, or authenticated, by the Authentication Service 232. Access to resources is controlled by comparing the "credentials" conferred to a user by the Privilege Service 234 with the rights to the resource, which are specified in the resource's Access Control List stored in Facility 236. The Login Facility 238 initializes a user's security environment, preferably through a Kerberos protocol as will be discussed, and the Registry Service 230 manages the information (such as user accounts) in the DCE Security database.

PKM is preferably implemented as a client/server application in a distributed computing environment (e.g., Open Group DCE) as described above. The PKM server preferably implements all PKM functions. In this illustrative DCE implementation, all target data is stored in DCE registry's ERA and the server accesses the data on behalf of each user on a client machine. Therefore, the PKM API is mapped to a set of remote procedure calls (RPCs) on each client machine using the DCE RPC mechanism. RPCs with different protection levels (e.g., privacy or integrity) and different properties are employed to pass data, depending on the API's security and semantic requirements. When the server receives a client's request, a thread is created to access the data in the ERA. If the request is a create, update, or delete operation, a write to the master registry is required. If the request is a query operation, a read from any slave registry is sufficient to carry out the operation. If a password-based target is queried, the password is retrieved from the ERA. Continuing with this DCE example, if a passticket-based ticket is queried, one more RPC is used to retrieve the secret key shared between the PKM server and the passticket server. The server then generates the passticket based on the secret key and other information configured for the target.

This approach provides several advantages. A framework-based SSO mechanism as described enables all kinds of targets to be defined for any user. Different PKM implementations can be pluggable using the generic API, without any changes to the programs using the PKM service. The described DCE implementation makes user authentication, secure communication and data management much easier.

Thus, according to another feature of this invention, a combination of the data model and the LC implementation obviates user specification of the particular program on the client when using the SSO mechanism to log on to a particular target. Thus, the user may install any program on the client machine, and the LC picks the appropriate one to logon to the target.

One design consideration of a single sign-on system is the network authentication between a single sign-on user and the single sign-on centralized server, and the secrecy of passwords and keys transmitted across networks. These two requirements can be achieved by utilizing the authentication and message encryption functions provided by any security service, such as DCE's Kerberos or NetSP's KryptoKnight. To make the SSO components portable to different security environments, the design and implementation of the SSO components should be independent of the underlying authentication protocols and encryption mechanisms.

The program template file (PTF) is a convenient mechanism for telling SSO how to interact with a given application or sub-system to perform SSO-related operations. They key benefit of the PTF is that it enables applications to be plugged into SSO without changing the SSO code itself, and without requiring any programs to be written to plug into the new application.

Summarizing, single sign-on is facilitated by storing all the passwords and keys belonging to a user in secure storage (either in local storage, a centralized password service, or in a smartcard), so that the user needs to remember only one ID and password. The single sign on ID and password is then used to authenticate the user. Upon authentication, the mechanism securely retrieves all the passwords for a user from the secure storage and automatically (without any additional user intervention) issues sign-ons to each application the user is authorized to access.

The present invention provides an authentication framework that allows the PKM and the CIM implementations to be separable from the rest of the single sign-on code. The functions provided by the aforementioned components are preferably implemented via a high-level API. Thus, a new implementation (such as Lotus Notes) can be added without causing a major redesign. This mechanism provides a logon coordination framework so that each specific target can be easily plugged into the single sign-on logon coordinator framework. This facilitates the support of the vast range of client server targets.

The present invention enables efficient access to iheterogeneous networks at reduced costs to thereby increase productivity for end-users and system administrators. These advantages are achieved by enabling users to sign-on once with a single ID and password to access business applications and data. The design goals achieved are ease of use, secure authentication of users, and logon coordination to multiple applications.

The present invention provides numerous other advantages. It is based on an easy to use interface, and provides a consistent look and feel across operating systems. The tool is also advantageous is that it integrates with operating system logons, is based on open standards, supports "one time" passwords, and is capable of leveraging existing security infrastructures.

One of the preferred implementations of the various modules described is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described our invention, what we claim as new and desire to secure by letters patent is set forth in the following claims.

What is claimed is:

1. A method of managing passwords of users desiring access to multiple target resources in a computer enterprise environment, comprising the steps of:

for each given user, associating each of a set of id/password pairs to each of a set of one or more respective targets, wherein each id/password pair is required to access a respective target resource;

storing the targets of each given user in a globally-accessible database; and in response to a given event, accessing the globally-accessible database to retrieve the targets of a given user;

wherein the retrieved targets are used in conjunction with locally-accessible logon information to access the respective target resources.

2. The method of managing passwords as described in claim 1 wherein the given event is entry of a single sign-on id/password of the given user.

3. The method of managing passwords as described in claim 2 further including using data in the targets to access the respective target resources.

4. The method of managing passwords as described in claim 1 wherein each target includes a target name, a set of target attributes, and key information.

5. The method of managing passwords as described in claim 4 wherein the set of target attributes includes attributes selected from the set of attributes consisting essentially of target type, domain name, host name, application name and target user name.

6. The method of managing passwords as described in claim 4 wherein the key information includes the password of the user for the target resource.

7. The method of managing passwords as described in claim 4 wherein each target further includes a user configuration identifying the user's target resource configuration logon/logoff preference.

8. The method of managing passwords as described in claim 4 wherein each target further includes a target class defining additional security restrictions, if any, associated with the target resource.

9. The method of managing passwords as described in claim 1 wherein the globally-accessible database is a DCE registry.

10. The method of managing passwords as described in claim 1 wherein the globally-accessible database is accessed from a client machine using a remote procedure call mechanism.

11. A method of managing passwords of users desiring access to multiple target resources in a computer enterprise environment, comprising the steps of:

for each given user, associating each of a set of id/password pairs to each of a set of one or more respective targets, wherein each id/password pair is required to access a respective target resource;

storing the targets of each given user in a globally-accessible database; and in response to entry by a given user at a client machine of a single-sign on id/password, accessing the globally-accessible database to retrieve the targets of the given user;

wherein the retrieved targets are used in conjunction with locally-accessible logon information to access the respective target resources.

12. The method of managing passwords as described in claim 11 wherein the globally-accessible database is accessed from a server using a remote procedure call.

13. The method of managing passwords as described in claim 12 further including the steps of:

returning the targets to the server from the globally-accessible database; and at the server, using data in the targets to access the respective target resources on behalf of the given user at the client machine.

14. The method of managing passwords as described in claim 11 wherein each target includes a target name, a set of target attributes, and key information.

15. The method of managing passwords as described in claim 14 wherein the set of target attributes includes attributes selected from the set of attributes consisting essentially of target type, domain name, host name, application name and target user name.

16. The method of managing passwords as described in claim 14 wherein the key information includes the password of the user for the target resource.

17. The method of managing passwords as described in claim 14 wherein each target further includes a user configuration identifying the user's target resource configuration logon/logoff preference.

18. The method of managing passwords as described in claim 14 wherein each target further includes a target class defining additional security restrictions, if any, associated with the target resource.

19. The method of managing passwords as described in claim 12 wherein the step of accessing the globally-accessible database includes accessing a protected server to obtain information necessary to generate a passticket associated with the target.

20. The method of managing passwords as described in claim 19 wherein the information is a secret key shared by the server and the protected server.

21. A method of managing passwords of users desiring access to multiple target resources in a computer enterprise environment, comprising the steps of:

for each given user, associating each of a set of id/password pairs to each of a set of one or more respective targets, wherein each id/password pair is required to access a respective target resource;

storing the targets of each given user in a globally-accessible database;

in response to entry by a given user at a client machine of a single-sign on id/password, accessing the globally-accessible database from a server to retrieve the targets of the given user; and returning the targets to the server from the globally-accessible database;

wherein the retrieved targets are used in conjunction with locally-accessible logon information to access the respective target resources.

22. The method of managing passwords as described in claim 21 further including the step of:

at the server, using data in the targets to access the respective target resources on behalf of the given user at the client machine.

23. The method of managing passwords as described in claim 21 wherein the step of accessing the globally-accessible database includes accessing a protected server to obtain information necessary to generate a passticket associated with the target.

24. The method of managing passwords as described in claim 23 wherein the information is a secret key shared by the server and the protected server.

25. Personal key manager framework for managing passwords of users desiring access to multiple target resources in a computer enterprise environment, comprising:

a globally-accessible database for storing, for each given user, a set of targets, each target having associated therewith an id/password pair required to access a respective target resource;

a first program executed on a client machine in response to entry of a single sign-on (SSO) id/password by a given user for issuing a request to obtain access to the target resources identified in the given user's set of targets; and a second program executed on a server machine and responsive to the request for retrieving the targets from the globally-accessible database and using data in the retrieved targets to access the respective target resources on behalf of the given user at the client machine;

wherein the retrieved targets are used in conjunction with locally-accessible logon information to access the respective target resources.

26. The personal key manager framework as described in claim 25 further including a protected server for storing necessary to generate a passticket associated with a given target.

27. The personal key manager framework as described in claim 26 wherein the information is a secret key shared by the server and the protected server.

28. The personal key manager framework as described in claim 25 wherein the request is issued to the second program using a remote procedure call service.

29. A computer program product in a computer-readable media for use in a server that manages passwords of users desiring access to multiple target resources in a computer enterprise environment, wherein, for each given user, a set of targets is stored in a globally-accessible database, each target having associated therewith an id/password pair required to access a respective target resource, the computer program product comprising:

means responsive to a given request for retrieving targets of a given user from the globally-accessible database; and means responsive to the retrieving means for using data in the retrieved targets to access the respective target resources on behalf of the given user;

wherein the retrieved targets are used in conjunction with locally-accessible logon information to access the respective target resources.

30. The computer oprogram product fast described in claim 29 wherein the given request is received from a client machine via a remote procedure call service.

31. The computer program product as described in claim 29 wherein the given request is an operation selected from a set of operations consisting essentially of create, update, delete and query.

* * * * *